United States Patent [19]

Ohtaka

[11] Patent Number: 5,483,621
[45] Date of Patent: Jan. 9, 1996

[54] METHOD AND APPARATUS FOR CONTROLLING DOCUMENT PRINTING IN A LINE PRINTER

[75] Inventor: Isao Ohtaka, Kawasaki, Japan

[73] Assignee: Fujitsu Limited, Kawasaki, Japan

[21] Appl. No.: 297,915

[22] Filed: Aug. 31, 1994

[30] Foreign Application Priority Data

Oct. 18, 1993 [JP] Japan .................................. 5-259806

[51] Int. Cl.⁶ ............................. G06K 15/00; G06F 1/00
[52] U.S. Cl. ........................................ 395/110; 395/117
[58] Field of Search ..................................... 395/117, 110, 395/111, 112, 164, 115, 196; 364/519

[56] References Cited

U.S. PATENT DOCUMENTS

| | | | |
|---|---|---|---|
| 4,939,669 | 7/1990 | Nishino | 364/519 |
| 5,047,956 | 9/1991 | Hirami et al. | 364/519 |
| 5,107,423 | 4/1992 | Sasaki et al. | 364/419 |
| 5,129,053 | 7/1992 | Makihara | 395/149 |
| 5,179,649 | 1/1993 | Masuzaki et al. | 395/148 |
| 5,189,731 | 2/1993 | Sakamoto et al. | 395/146 |
| 5,243,691 | 9/1993 | Kuwabara et al. | 395/112 |
| 5,276,802 | 1/1994 | Yamaguchi et al. | 395/164 |
| 5,299,295 | 3/1994 | Kim et al. | 395/111 |
| 5,321,796 | 6/1994 | Komaki | 395/110 |
| 5,367,618 | 11/1994 | Ishida | 395/145 |
| 5,379,368 | 1/1995 | Imai et al. | 395/117 |
| 5,394,514 | 2/1995 | Matsubara | 395/115 |

*Primary Examiner*—Mark R. Powell
*Assistant Examiner*—Steven P. Sax
*Attorney, Agent, or Firm*—Staas & Halsey

[57] ABSTRACT

A line printer which processes print data transmitted from a host computer and prints a document on a paper, comprising a character data processing portion that converts print data that are input into character codes, a buffer for storing character codes that are processed, a memory for storing fonts for the character codes, a bit map memory for storing character pattern data to be printed, a character pattern expansion portion that forms character patterns by calling, from the memory, fonts for said character codes and expands and stores the formed character patterns in the bit map memory, and a printing mechanism for printing the content of the bit map memory, wherein when a plurality of documents having a width narrower than one-half the width of the bit map memory are to be printed at one time on the printing paper according to a first aspect, the print data are transmitted having inserted therein the expansion position data that instruct the division of the bit map memory into a plurality of regions for the documents and, according to a second aspect, the print data are transmitted having inserted therein an address which instructs the division of buffer into a plurality of regions for the documents. Accordingly, the invention makes it possible to print a plurality of documents on one page without changing the data of the documents.

24 Claims, 14 Drawing Sheets

Fig.10A
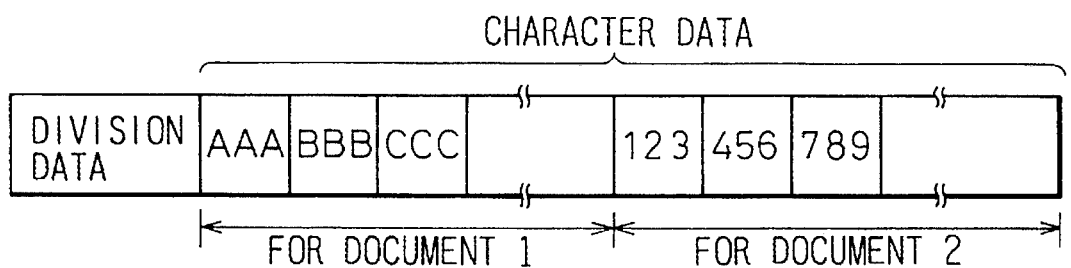
Fig.10B  Fig.10C
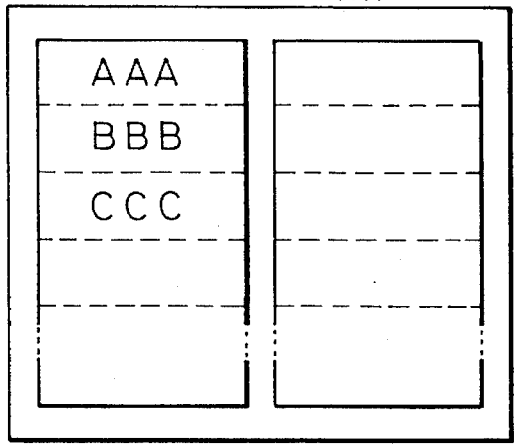
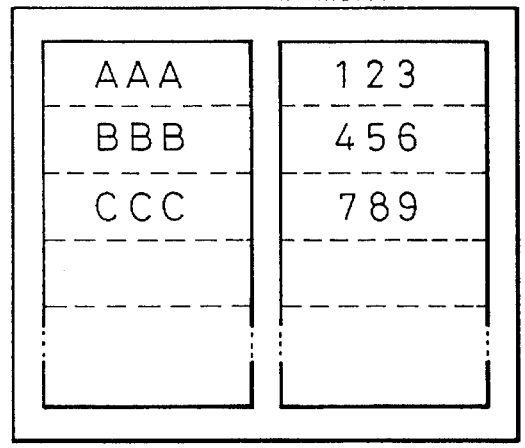
Fig.10D  Fig.10E

METHOD AND APPARATUS FOR CONTROLLING DOCUMENT PRINTING IN A LINE PRINTER

BACKGROUND OF THE INVENTION

1. Field of the Invention

The present invention relates to a method and an apparatus for controlling document printing, onto a printing paper, in a line printer.

2. Description of the Related Art

In recent years, line printers have been put into practical use. The printers use continuous paper and, particularly, folded printing paper with perforations and print, at a high speed, data sent from a host computer which is the data processor.

In such a line printer, in general, the data to be printed are transmitted from the host computer to a character data processing portion of the line printer. The data to be printed are sequentially converted into codes for the line printer by the character data processing portion in the control unit of the line printer, and are stored in a buffer. Code data, for one page, that are stored in the buffer are then read out line by line by a character conversion portion of the line printer, converted into character patterns corresponding to the codes, and are stored in a bit map memory as an image data. The conversion into character patterns corresponding to the codes is carried out based upon a character font stored in a ROM in the line printer.

After the code data of one page are converted into character patterns and are stored in a bit map memory, the contents (=the image data) of the bit map memory are sent to a print control mechanism in the line printer and are printed onto the continuous paper.

In the above line printer, in which the speed for feeding the printing paper has been predetermined, there remains a problem in that the same amount of time is required for printing a document irrespective of the width of the document. That is, when the line printer prints a document onto the printing paper, the document having a width which is smaller than one-half the printable width of the printing paper, the same amount of printing time is required irrespective of the width of the document when the paper is fed at a predetermined speed, since the data of one document are not expanded in the bit map memory.

To correct this situation, the following method can be contrived.

(1) Character data of the same lines of two documents are combined together as printing data of one line by the host computer, and are sent to the line printer.

(2) Character data of the same lines of two documents are converted into codes as the printing data of one line, and are stored in the buffer.

(3) Code data of the same lines of two documents are converted into character patterns and are stored in the bit map memory in a state where the data of the two documents are stored in the buffer that corresponds to a page of the printing paper.

(4) After character pattern data of two documents are all stored in the bit map memory, the print control mechanism of the line printer is driven to print the two documents on a single piece of paper.

In order to realize this method, in which a plurality of documents are processed as one document, the software must be changed on the host computer side requiring considerable time and effort to change the software. When the software of the host computer is changed, furthermore, trouble may occur on the host computer side due to the change in the software.

SUMMARY OF THE INVENTION

The object of the present invention is to provide a method, of controlling the line printing in a line printer, which is capable of printing a plurality of documents on a single page of the printing paper without the need of changing the software of a host computer when the printing data sent from the host computer are the data of document of a width which is smaller than one-half the width of the printing paper that will be printed by the line printer, and to provide an apparatus therefor.

In order to accomplish the above-mentioned object according to a first aspect of the present invention, there is provided a line printer which processes printing data transmitted from a host computer, and prints a document on a paper, comprising a character data processing portion that converts printing data input from the host computer into character codes for the line printer, a buffer for storing code data that are processed, a font memory for storing character fonts for the codes, a bit map memory for storing character pattern data to be printed, a character pattern expansion portion that forms character patterns by calling, from the font memory, fonts for the code data upon a request from the character data processing portion and stores the formed character patterns in the bit map memory, and a printing mechanism for printing the content of the bit map memory, wherein:

- printing data are transmitted to the line printer having inserted therein expansion position data which governs the division the bit map memory into a plurality of regions for the documents;
- the character data processing portion sends the expansion position data in the printing data to the character pattern expansion portion, converts other printing data into codes and stores them in the buffer;
- the expansion position data are analyzed by the character pattern expansion portion;
- the bit map memory is divided into a plurality of regions by the character pattern expansion portion depending upon the result of analysis of the expansion position data;
- the character pattern expansion portion is informed of every completion of storage of the character data for each document in the buffer by the character data processing portion;
- the character pattern expansion portion calls fonts from the font memory in accordance with the code data read out from the buffer upon a request from the character data processing portion; and
- the character pattern expansion portion stores called fonts as character patterns sequentially in a plurality of regions in the bit map memory.

The expansion position data may be inserted in the printing data from a monitor/control panel that is provided for the line printer. Besides, character data for a plurality of documents may sequentially input from the host computer after the expansion position data is inserted in the line printer. Further, when a partial printing instruction is inserted in a portion of the printing data, the printing mechanism may start printing the document at the moment when the all data for one page of the document is stored in at least one of the plurality of regions divided in the bit map memory.

In order to accomplish the above-mentioned object according to a second aspect of the present invention, furthermore, there is provided a line printer wherein:

printing data transmitted to the line printer has inserted therein an address of an instruction for dividing the buffer into a plurality of document regions;

the character data processing portion analyzes the address;

the character data processing portion divides the buffer into a plurality of regions depending upon the result of analysis of the address;

the character data processing portion converts the printing data into codes which are sequentially stored in a plurality of buffer regions that are divided;

the character pattern expansion portion is informed of every completion of storage of all data for one page of the paper in the buffer by the character data processing portion;

the character pattern expansion portion calls fonts from the font memory in accordance with the code data read out from the buffer upon a request from the character data processing portion; and the character pattern expansion portion stores called fonts as character patterns in the bit map memory.

The expansion position data may be inserted in the printing data from a monitor/control panel that is provided on the line printer. Besides, character data for a plurality of documents may sequentially input from the host computer after the expansion position data is inserted in the line printer.

According to the method and apparatus for controlling the line printing in a line printer of the present invention, a plurality of documents can be printed on a page without the need of changing the document data. According to the first aspect of the present invention in which the bit map memory is divided into a number of documents, the character pattern in the bit map memory can be expanded for each of the documents making it possible to freely design the data with the document as a unit.

BRIEF DESCRIPTION OF THE DRAWINGS

The present invention will be more clearly understood from the description as set forth below with reference to the accompanying drawings, wherein:

FIG. 10A is a diagram illustrating printing data input to the line printer in the method of controlling the document printing in the line printer of the present invention shown in FIG. 9;

FIG. 10B is a diagram Illustrating a state of the buffer storing the printing data of the first document of the present invention;

FIG. 10C is a diagram illustrating a state of the buffer storing the printing data of the second document of the present invention;

FIG. 10D is a diagram illustrating the bit map memory storing the printing data of the first document only of the present invention;

FIG. 10E is a diagram illustrating the bit map memory storing the printing data of the first and the second document of the present invention;

DESCRIPTION OF THE PREFERRED EMBODIMENTS

Before describing the preferred embodiments, an explanation will be given of the conventional line printer shown in FIGS. 1A to 5D.

Figure 1A:
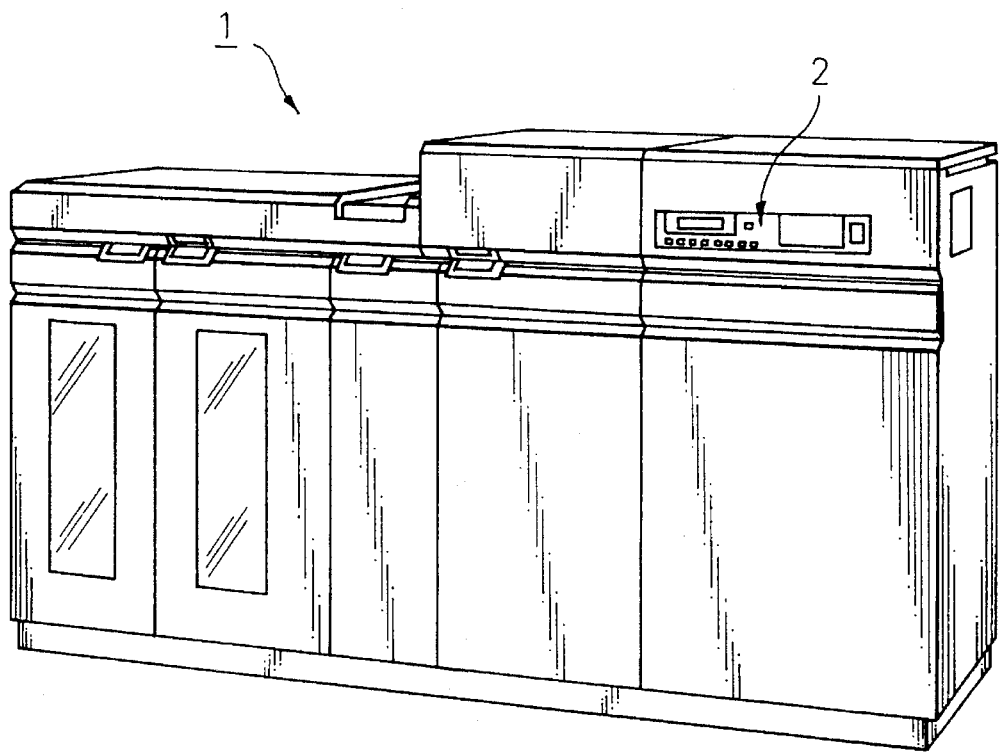
FIG. 1A is a diagram illustrating the appearance of a line printer to which the present invention is adapted.

FIG. 1A illustrates the appearance of a conventional line printer 1 to which the present invention is adapted, wherein reference numeral 2 denotes an operator panel by which the data are input to the line printer 1. The printing system employed in the line printer 1 of FIG. 1A is a dry electrophotographic system based upon laser writing. This line printer 1 executes the printing on a printing paper at a high speed based upon the printing data sent from a host computer that is not shown. As the printing paper, there is used a folded printing paper with perforations on both sides thereof.

Figure 1B:
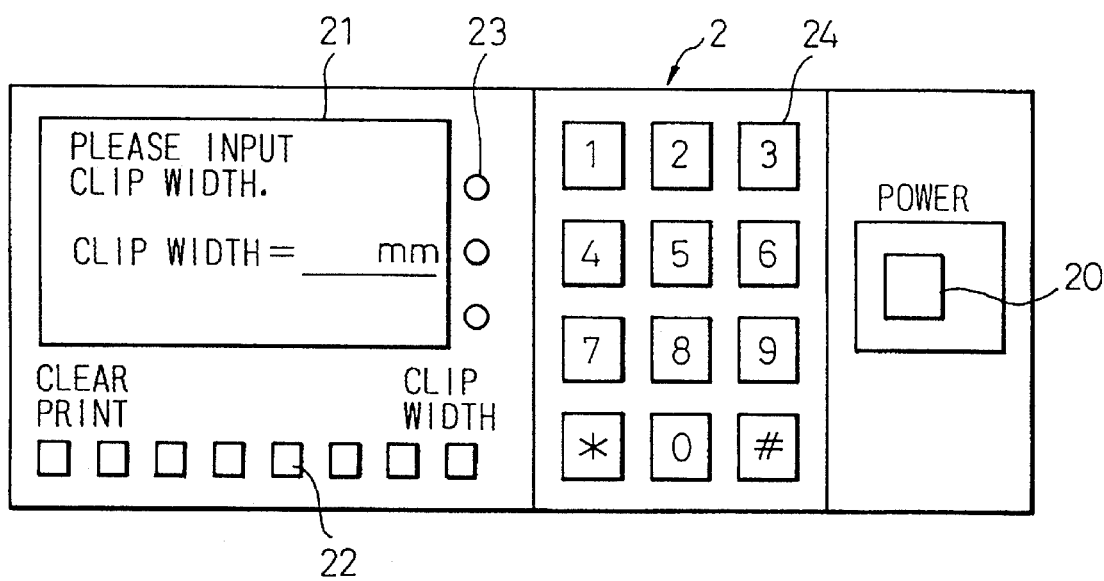
FIG. 1B is a diagram illustrating, on an enlarged scale, the operator panel of the line printer shown in FIG. 1A.

FIG. 1B is a diagram illustrating, on an enlarged scale, the operator panel 2 of the line printer 1 shown in FIG. 1A. The operator panel 2 is provided with a power switch 20, a display 21, function switches 22, indicators 23, a ten-key pad 24, etc.

Figure 2A:
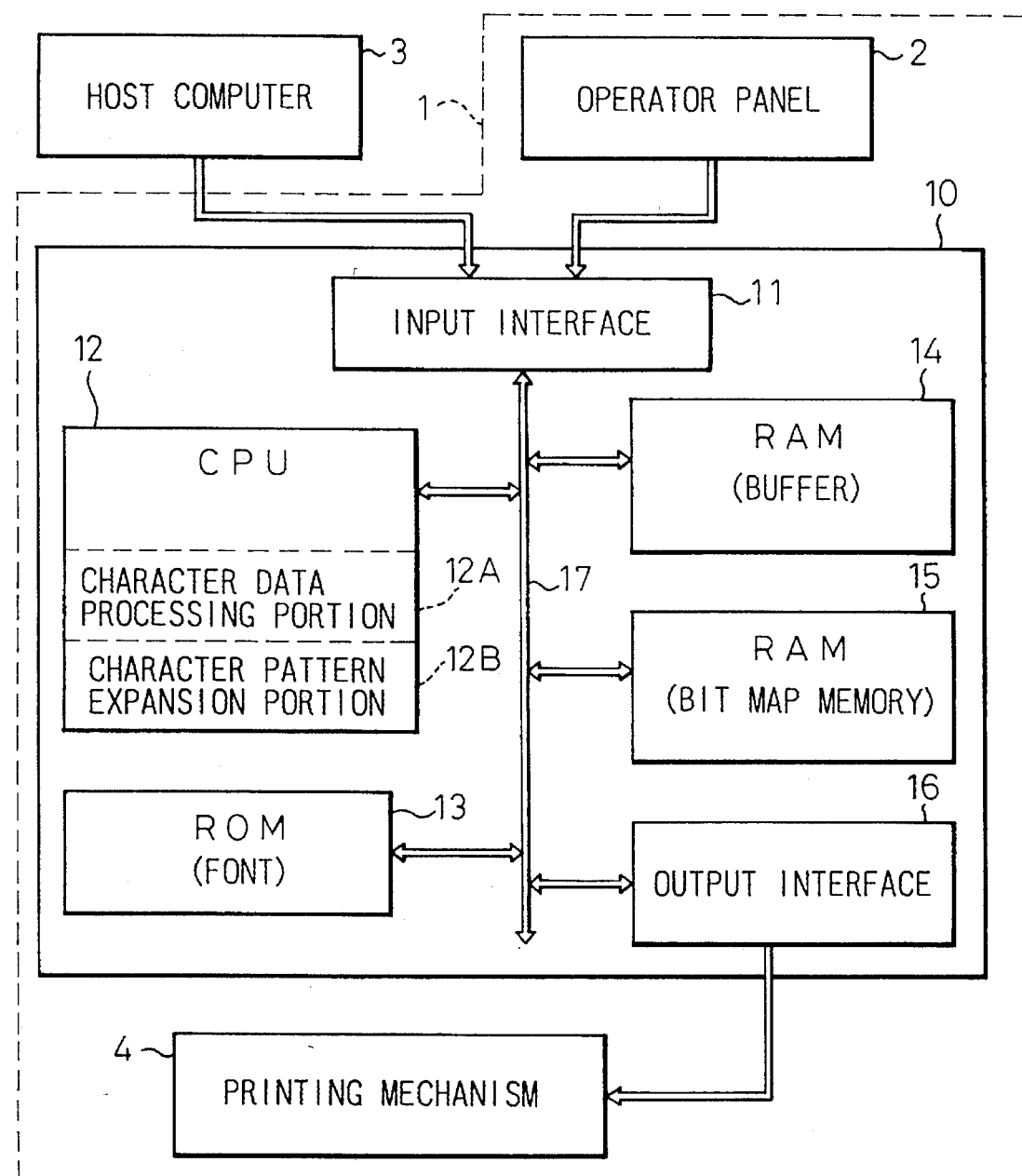
FIG. 2A is a block diagram illustrating a conventional internal constitution of the line printer shown in FIG. 1A.

FIG. 2A is a block diagram illustrating the internal constitution of the line printer 1 of FIG. 1A. The line printer 1 has the operator panel 2 and includes a printing mechanism 4 for printing the printing paper and a print controller 10. The print controller 10 comprises an input interface 11 which receives signals from the host computer 3 and the operator panel 2, a CPU 12, a ROM 13, RAMs 14, 15, and an output interface 16, which are connected to each other through a bus 17.

The CPU 12 includes a character data processing portion 12A and a character pattern expansion portion 12B. The ROM 13 stores fonts corresponding to the character codes. The RAM 14 is a buffer for storing character data that are sent from the host computer 3. The RAM 15 is a memory for expanding bits or a bit map memory having sufficient storage capacity for at least a page of printing paper. The printing mechanism 4 is connected to the output interface 16.

Figure 2B:
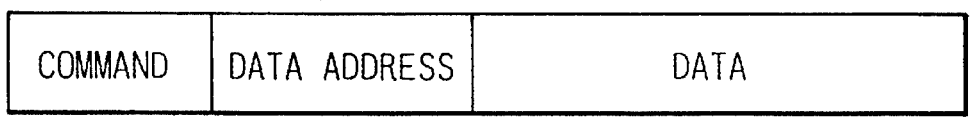
FIG. 2B is a diagram illustrating the form of printing data sent from a host computer to a print controller of FIG. 2A.

FIG. 2B shows a form of data sent from the host computer 3 to the print controller 10 of FIG. 2A. The data include a command, a data address and character data.

Figure 3:
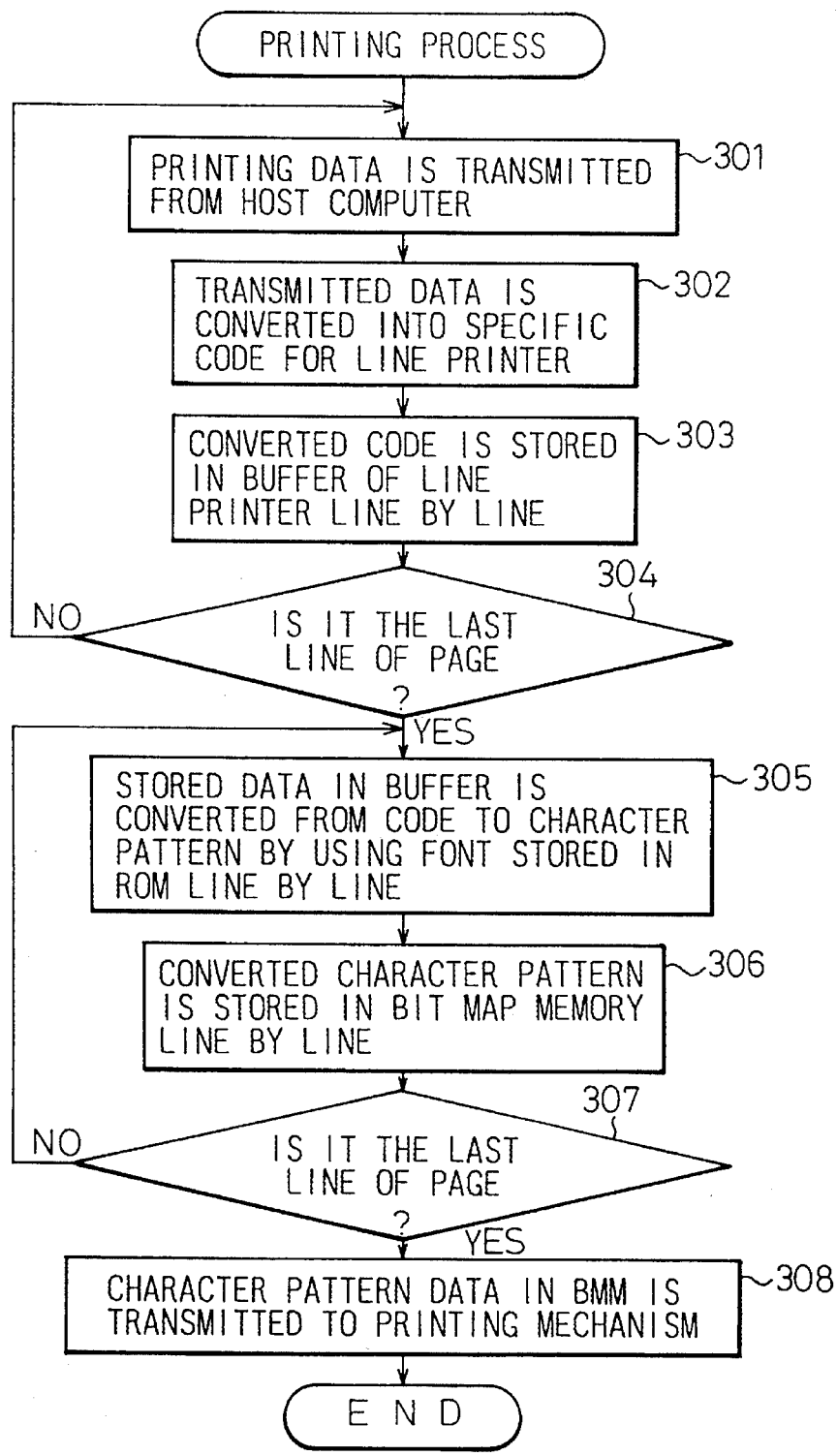
FIG. 3 is a flow chart for explaining a method of controlling the printing of document in a conventional line printer.

FIG. 3 is a flow chart explaining the method of controlling the printing of a document in a conventional line printer 1. When character data to be printed are transmitted, via the input interface 11, to the character data processing portion 12A from the host computer 3 which is a data processor as represented by step 301, the character data processing portion 12A sequentially converts the transmitted data into specific codes for the line printer as represented by step 302, and the converted data are stored in the buffer 14 of the line printer line by line as represented by step 303.

Step 304 judges whether a line storing the converted data is the last line of a page of the printing paper or not. When it is not the last line, the operations are repeated from step 301 to step 303. After the storage of codes of one page is finished, the character pattern expansion portion 12B operates. As represented by step 305, the character pattern expansion portion 12B takes out character data (codes) in the buffer 14 line by line, and forms character patterns for the character codes based upon fonts stored in the ROM 13. The thus converted character patterns are expanded and stored in the bit map memory 15, line by line as represented by step 306.

Step 308 judges whether the expansion of character data of one page on the bit map memory 15 is finished or not relying upon whether the line that is stored is the last line or not. When it is not the last line, the processing from step 305 to step 306 is repeated. On the other hand, when the line that is stored is the last line and expansion of character data of one page on the bit map memory 15 is finished, the program proceeds to step 308.

In step 308, the character pattern data expanded in the bit map memory 15 are fed to the printing mechanism via the output interface 16 to print one page.

Figure 4:
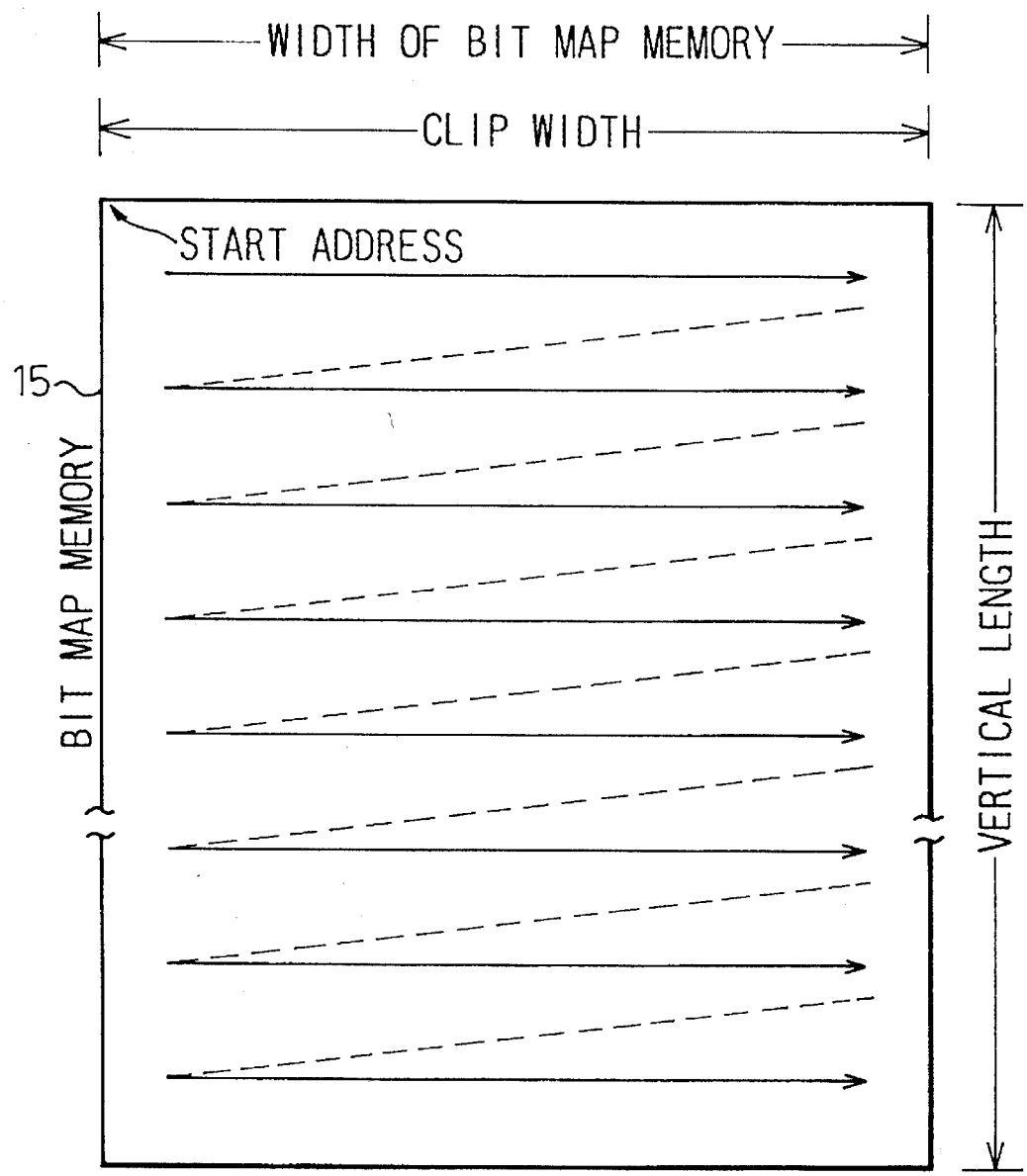
FIG. 4 is a diagram illustrating the expansion of printing data in a bit map memory in the conventional line printer.

FIG. 4 is a diagram illustrating the expansion of printing data in the bit map memory 15 in the conventional line printer 1 described with reference to FIG. 3. Usually, expansion positions on the bit map memory 15 have been determined in advance by a start address, width of bit map memory, clip width and vertical length of the bit map memory 15. The clip width stands for a printable region on the bit map memory 15. In the example of FIG. 4, the clip width is in agreement with the width of the bit map memory. Depending upon the cases, however, the clip width may be set to be narrower than the width of the bit map memory.

When the data of one page are treated line by line by the character data processing portion 12A and are stored in the buffer 14, the character pattern expansion portion 12B shown in FIG. 2A converts the character data into bit patterns and sequentially expands them toward the right from the upper left portion (start address of bit map memory) that has been set in advance on the bit map memory 15 shown in FIG. 4, and the character data of the next line are sequentially expanded toward the right from the left end of the next line of the bit map memory 15.

According to the conventional print controller 10, however, the printing data of a document have been expanded on the bit map memory 15 as mentioned above. Even when a document having a very narrow width (smaller than one-half the width that can be printed by the printing mechanism) is to be printed, therefore, the same printing time is required irrespective of whether the width of the document is wide or narrow since the paper-feeding speed of the printing mechanism has been determined and the character patterns of documents of only one piece of the printing paper are expanded in the bit map memory.

Figure 5A:
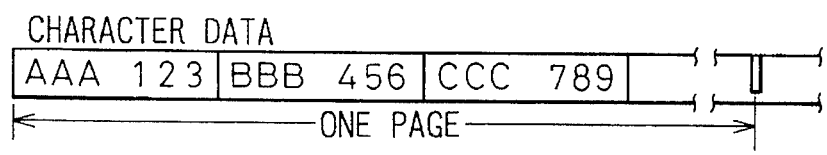
FIG. 5A is a diagram illustrating a conventional constitution of character data of when two documents are to be printed on a piece of paper.

In order to improve on this situation, a plurality of documents having very narrow widths have been printed on a piece of printing paper according to a method shown in FIGS. 5A to 5D. That is, according to the prior art, the two documents are regarded by the host computer 3 to be one document, and the character data of the same lines of the two documents are sequentially transmitted in combination from the host computer 3 to the character data processing portion 12A as shown in FIG. 5A. In this example, when the character data of the first line of the first document are "AAA" and the character data of the first line of the second document are "123", the host computer 3 transmits the data "AAA, 123" as the data of the first line to the character data processing portion 12A. The character data "AAA, 123" are formed by software processing.

Thereafter in the same manner, the character data "BBB, 456" of the second lines of the first document and of the second document, and the character data "CCC, 789" of the third lines of the first document and of the second document, are sent to the character data processing portion 12A as shown in FIG. 5A.

Figure 5B:
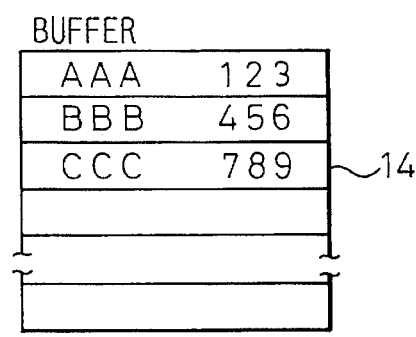
FIG. 5B is a diagram illustrating a state in which the character data of FIG. 5A that are input are stored in the buffer according to a conventional control method.
Figure 5C:
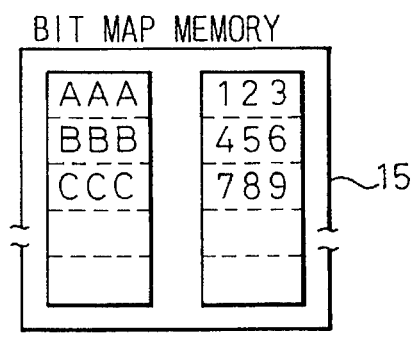
FIG. 5C is a diagram illustrating a state of the bit map memory of when the character data stored in the buffer shown in FIG. 5B are expanded on the bit map memory.
Figure 5D:
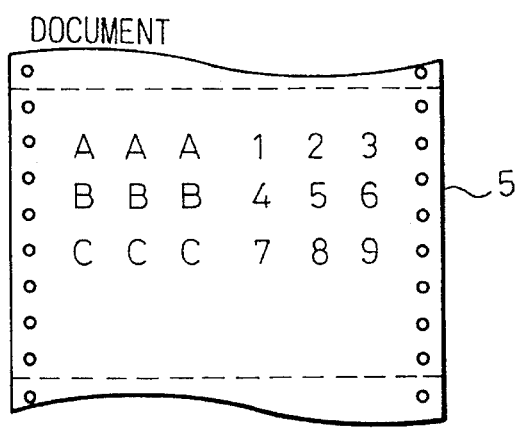
FIG. 5D is a diagram showing a paper that is printed using the data expanded on the bit map memory of FIG. 5C.

Upon receiving the character data shown in FIG. 5A, the character data processing portion 12A executes the code conversion, and stores the character data of the lines of the first and second documents in the buffer 14 in a form as shown in FIG. 5B with the line as a unit. The character data stored in the buffer 14 are converted by the character data expansion portion 12B into character patterns of character data of one line and are, then, expanded in the bit map memory 15 as shown in FIG. 5C. FIG. 5D is a diagram illustrating character data on the printing paper printed by the printing mechanism 4 using the data expanded in the bit map memory 15.

Here, when a plurality of documents are printed on one page in order to process the document data in the bit map memory 15 with one page as a unit using the conventional line printer 1, the software (user resource) in the host computer must be changed as mentioned earlier. That is, when a plurality of documents are to be printed on one page, synthesis processing is carried out by the software in the host computer such that the two documents appear to be a single document.

However, the software of the host computer is voluminous, and changing the software of the host computer requires considerable time and effort. Moreover, changing the software of the host computer may cause trouble in the software.

Figure 6:
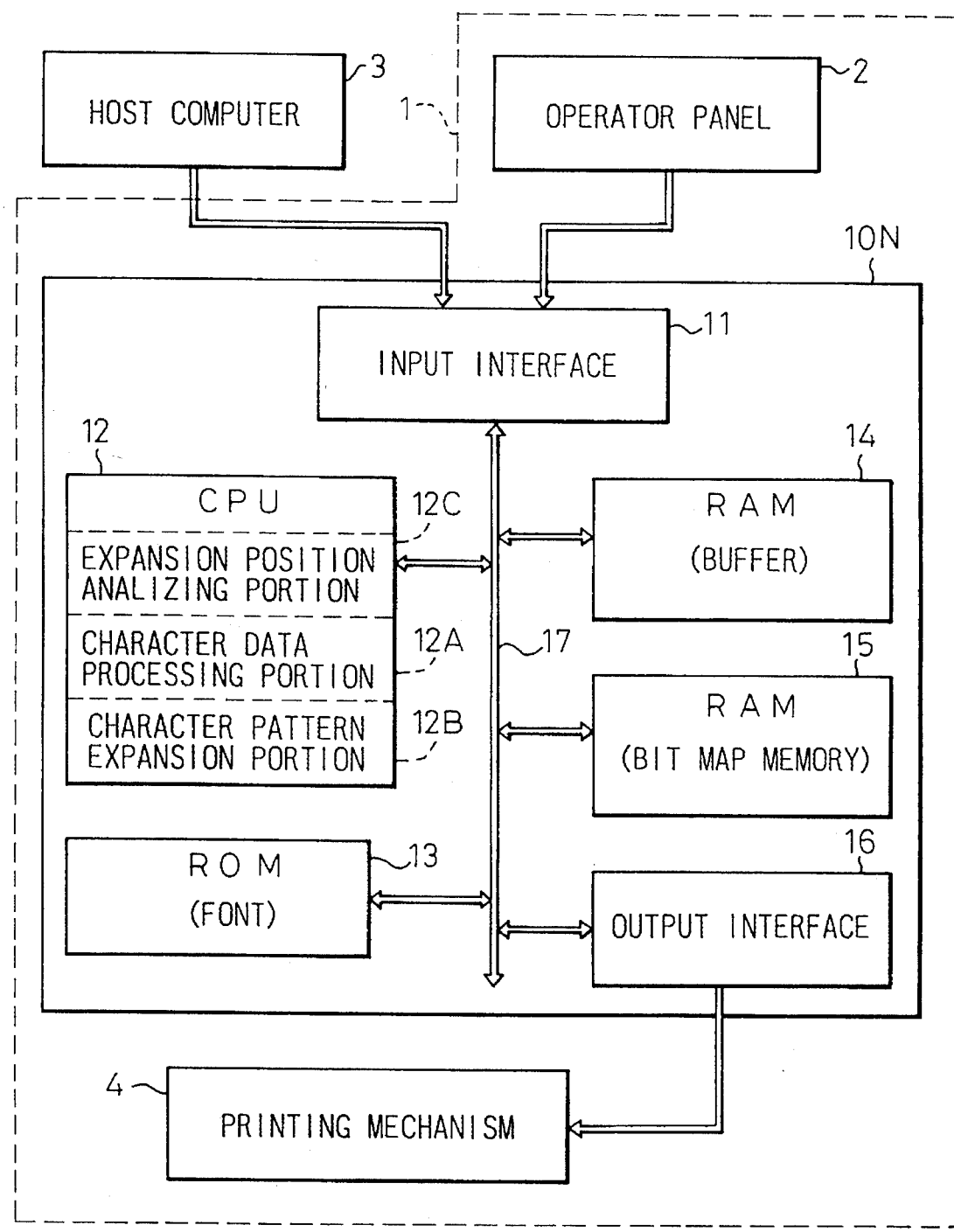
FIG. 6 is a block diagram illustrating the internal constitution of a line printer of the present invention.

FIG. 6 is a block diagram illustrating the internal constitution of the line printer 1 of the present invention shown in FIG. 1A, and wherein the same constituent members as those of the conventional line printer 1 of FIG. 2A are denoted by the same reference numerals.

The line printer 1 has an operator panel 2 and includes a printing mechanism 4 for printing the printing paper and a print controller 10N. The print controller 10N comprises an input interface 11 which receives signals from the host computer 3 and the operator panel 2, a CPU 12, a ROM 13, RAMs 14, 15, and an output interface 16, which are connected to each other through a bus 17.

The CPU 12 includes a character data processing portion 12A, a character pattern expansion portion 12B and an expansion position analyzing portion 12C. The ROM 13 stores fonts corresponding to the character codes. The RAM 14 is a buffer for storing character data that are sent from the host computer 3. The RAM 15 is a memory for expanding bits or a bit map memory having a storage capacity of at least a page of the printing paper. The printing mechanism 4 is connected to the output interface 16.

The printing mechanism 4 is equipped with a circuit and a mechanism for printing the content of the bit map memory 15, and a paper feed mechanism. There is used a printing paper on which a plurality of documents can be printed side by side to cope with the case where a plurality of documents are printed according to the present invention.

Figure 7A:
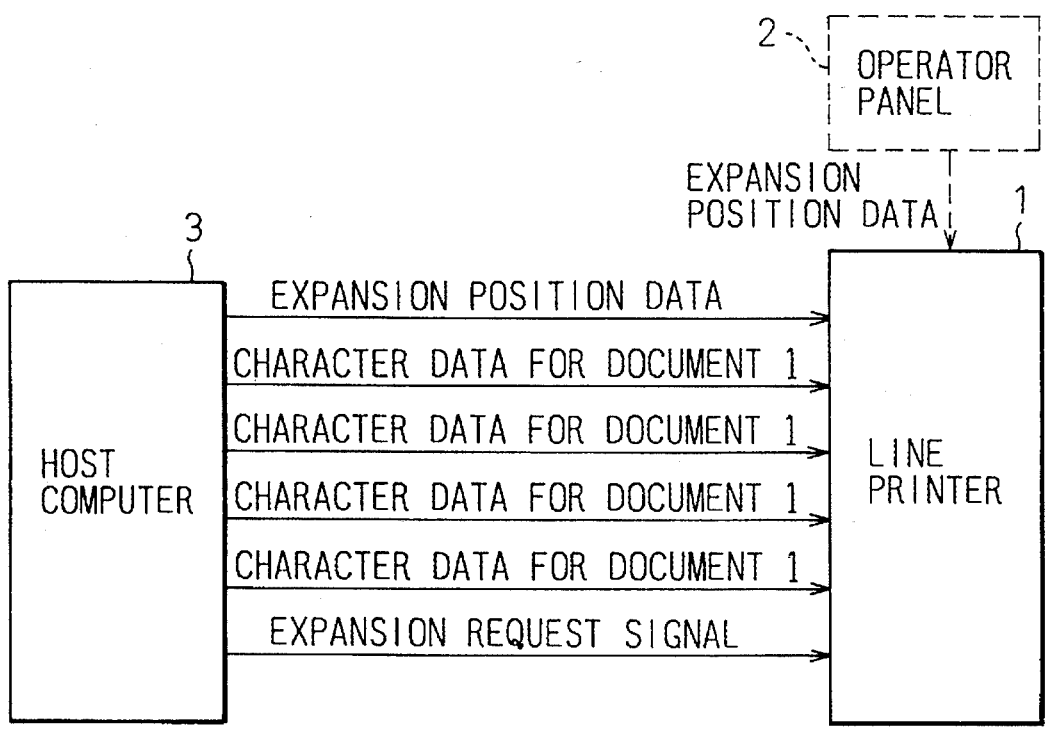
FIG. 7A is a diagram illustrating the transmission of printing data of a first document from a host computer in a method of controlling the document printing in the line printer of the present invention.

FIG. 7A is a diagram of a command sequence for explaining the transmission of printing data of the first document from the host computer 3 in the method of controlling document printing in the line printer 1 of the present invention. In order to print a plurality of documents according to the present invention, the expansion position data are fed in the form of a command from the host computer 3 to the line printer 1. The expansion position data can further be input from the monitor/control operator panel 2 in the line printer 1 as indicated by a broken line in FIG. 7A in addition to from the host computer 3.

To input the expansion position data through the operator panel 2 as shown in FIG. 1B, a corresponding function switch 22 of the operator panel is depressed. Then, on a display 21 of the operator panel 2 is displayed a message that asks for the input of expansion position data, e.g., "PLEASE INPUT CLIP WIDTH". The width can hence be input using the ten-key pad 24.

Setpoint values designated by the expansion position data will now be explained with reference to FIG. 8.

Figure 8:
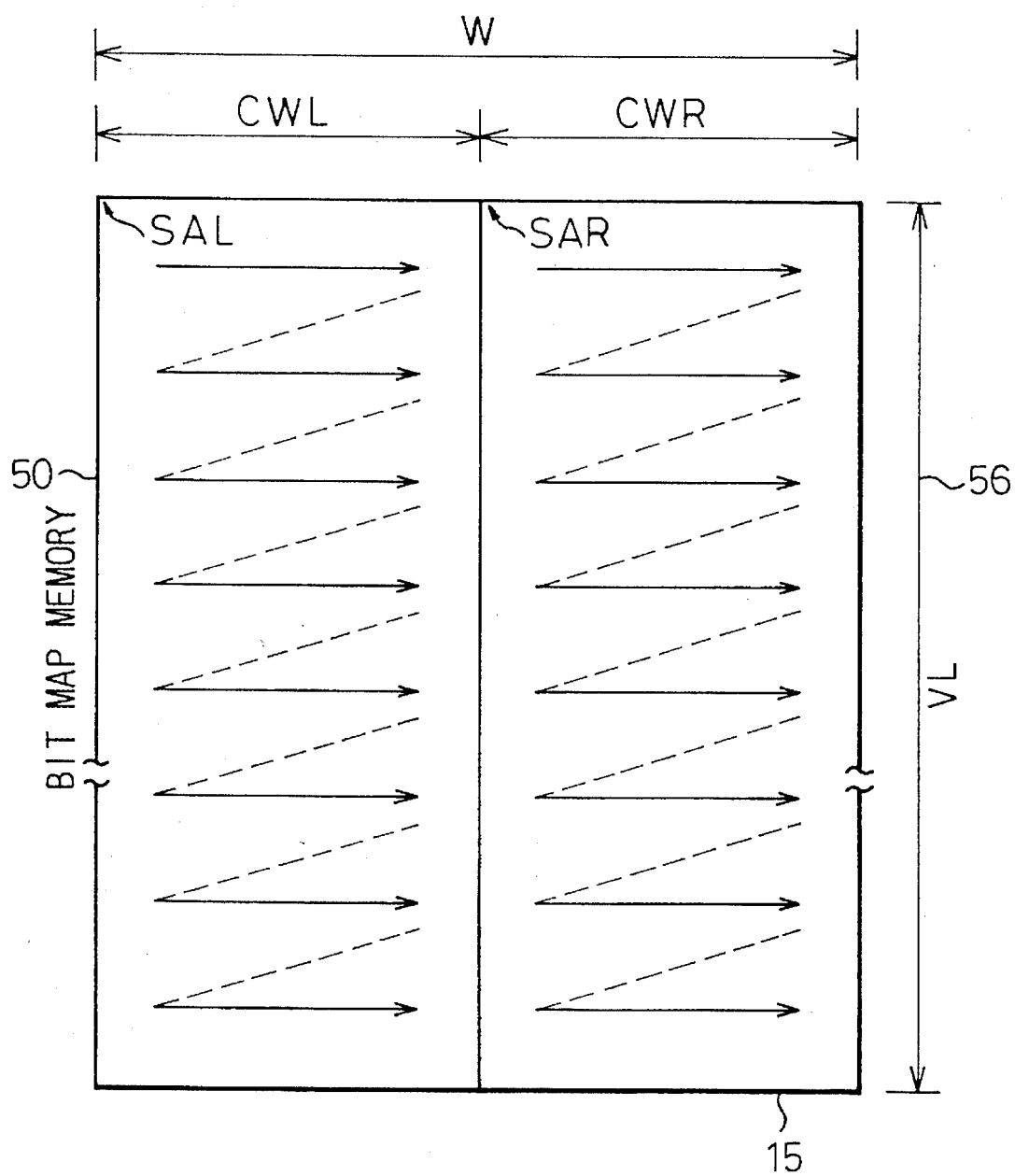
FIG. 8 is a diagram illustrating a state in which the bit map memory is divided by the method of controlling the document printing in the line printer of the present invention.

FIG. 8 is a diagram illustrating a state in which the bit map memory 15 is divided into two in the method of controlling the document printing in the line printer of the present invention. In order to divide the bit map memory 15 into two in the lateral direction, the expansion position data includes the following values. That is, the expansion position data include a start address SAL for the document on the left side for storing a bit map (bit pattern) for the documents, a start address SAR for the document on the right side, a width W of the bit map memory 15, a clip width CWL of the document on the left side, a clip width CWR of the document on the right side, and a vertical length VL of the bit map memory.

The expansion position data shown in FIG. 7A are input to the line printer 1, analyzed by the expansion position analyzing portion 12C in the print controller 10N shown in FIG. 6, and are transferred to the character pattern expansion portion 12B which changes the setpoint values related to the expanded positions on the bit map memory 15 depending upon the expansion position data that are received.

After the expansion position data shown in FIG. 7A are fed as a command to the print controller 10N, a plurality of character data for the first document are input from the host computer 3 to the print controller 10N in the line printer 1. The character data are then converted into codes in a buffer through the character data processing portion 12A in the print controller 10N, and are stored in the buffer 14. When the character data of the first document are all stored in the buffer 14, a request for expansion is input to the character pattern expansion portion 12B from the host computer 3.

Figure 7B:
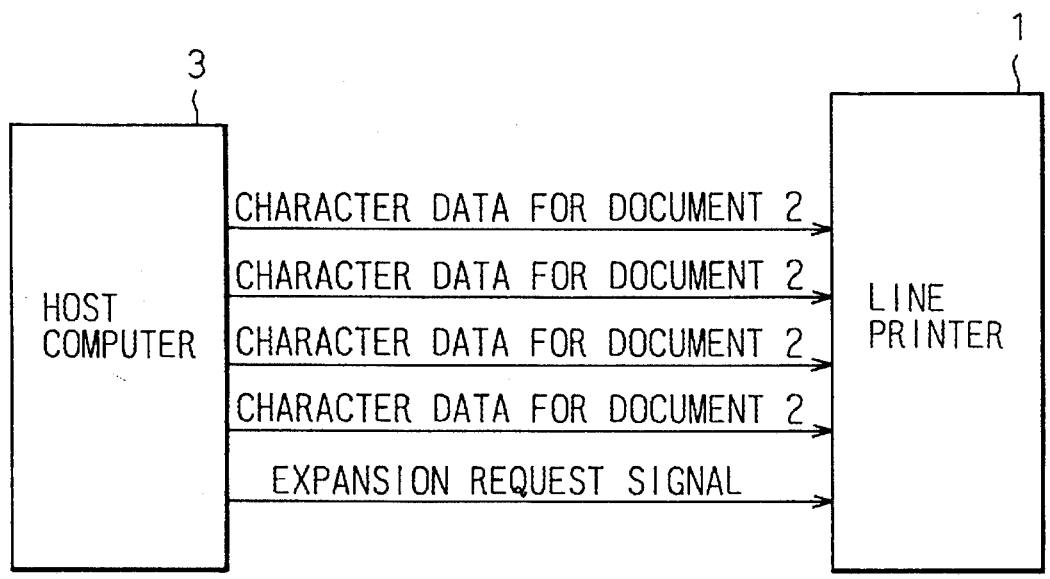
FIG. 7B is a diagram illustrating the transmission of printing data of a second document from the host computer in the method of controlling the document printing in the line printer of the present invention.

Thereafter, the host computer 3 inputs to the line printer 1 a plurality of character data of the second document which is different from the above document. FIG. 7B is a diagram for explaining the transfer of character data of the second document from the host computer 3. When a plurality of character data of the second document are input from the host computer 3 to the print controller 10N in the line printer 1, the character data processing portion 12A in the print controller 10N converts the character data into codes in a buffer and stores them in the buffer 14. Thus, as the character data of the second document are all stored in the buffer 14, a request for expansion is input from the host computer 3 to the character pattern expansion portion 12B.

Figure 9:
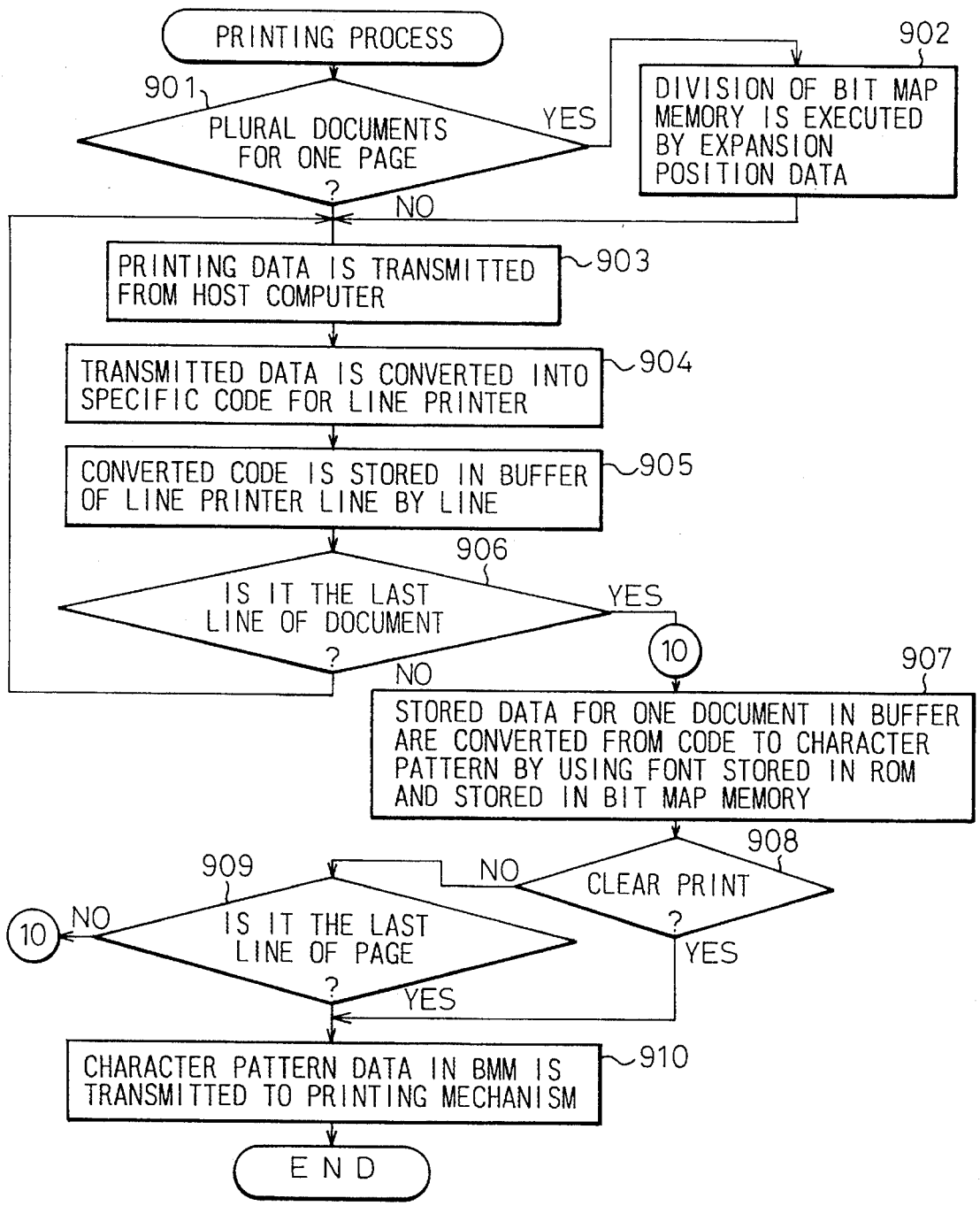
FIG. 9 is a flow chart illustrating the method of controlling the document printing in the line printer according to an embodiment of the present invention.

FIG. 9 is a flow chart for explaining the method of controlling the document printing in the line printer according to an embodiment of the present invention.

At step 901 in this embodiment, first, the expansion position analyzing portion 12C in the print controller 10N judges whether or not an instruction is issued from the host computer 3 or the operator panel 2 to change the expansion positions. When no instruction is issued to change the expansion positions, the program proceeds to step 903. When there is an instruction to change the expansion positions, however, the program proceeds to step 902 where division of the bit map memory 15 is executed by the expansion position data. That is, the aforementioned bit map memory expansion values W, CWL, CWR and VL are set, and the data are transmitted to the character pattern expansion portion 12B.

At step 903, the character data to be printed are transmitted from the host computer 3 to the character data processing portion 12A via the input interface 11. At the subsequent step 904, the received data are sequentially converted by the character data processing portion 12A into particular codes for the line printer. The converted data are then stored line by line in the buffer 14 of the line printer as represented by step 905.

At step 906, it is judged whether the line storing the converted data is the last line of a page of the printing paper or not. When it is not the last line, the operations of from step 903 to step 905 are repeated. When the storage of one page of codes is finished, the character pattern expansion portion 12B is actuated.

As represented by step 907, the character pattern expansion portion 12B takes out character data (codes) of one document in the buffer 14 line by line, and forms character patterns from the character codes based upon fonts stored in the ROM 13. The thus converted character patterns are expanded line by line in the bit map memory 15 and are stored.

When the character data of one document are expanded on the bit map memory 15, it is judged at step 908 whether "CLEAR THE PRINT" should be executed or not. The "CLEAR THE PRINT" mode is for a mode which readily executes the printing of data of one document when the data expansion of one document is finished, although there exists an expansion region for other documents in the bit map memory 15.

When the "CLEAR THE PRINT" mode has been set in advance, the program proceeds to step 910 where the character pattern data of one document expanded in the bit map memory 15 are sent, via the output interface 16, to the printing mechanism to be printed.

When the "CLEAR THE PRINT" mode has not been set in advance, on the other hand, the program proceeds to step 909 where it is judged whether the expansion of one page of character data on the bit map memory 15 is finished or not based upon whether the expanded line is the last line of the second document or not. When it is judged that the expanded line is not the last line, the processing of step 907 is repeated. When the stored line is the last line, and the expansion of one page of character data on the bit map memory 15 is finished, the program proceeds to step 910 where character pattern data of one document expanded on the bit map memory 15 are sent, via the output interface 16, to the printing mechanism to be printed.

Here, the "CLEAR THE PRINT" mode can also be designated by depressing a predetermined function key 22 of the operator panel 2 shown in FIG. 1B.

FIGS. 10A to 10E illustrate the operation of an embodiment that corresponds to the case of data of a plurality of documents when the bit map memory 15 is divided. For instance, when the bit map memory 15 is divided into two as shown in FIG. 8, the bit map width W of the bit map memory 15 is divided in advance into clip widths CWL and CWR by the expansion position data, and there are set a start address SAL on the left side, a start address SAR on the right side, and a vertical length VL.

In this state, when the character data "AAA, BBB, --- ---" are input as the first document from the host computer 3 and the character data "123, 456, --- ---" are input as the second document, the expansion position data are input as division data before the character data of the first document and the second document as shown in FIG. 10A.

Then, as the printing data shown in FIG. 10A are input from the host computer 3, the character data processing portion 12A, first, processes the character data of the first document and stores them in the buffer 14 as shown in FIG. 10B. The contents of the buffer are expanded by the character data expansion portion 12B, i.e., expanded to the left half of the bit map memory 15 and are stored as shown in FIG. 10D. When the above-mentioned "CLEAR THE PRINT" is designated in this state, the contents of the bit map memory 15 are printed by the printing mechanism onto the printing paper.

When "CLEAR THE PRINT" is not designated, the character data processing portion 12A processes the character data of the second document and stores them in the buffer 14 as shown in FIG. 10C. The contents of the buffer are expanded in the character data expansion portion 12B, i.e., expanded into right half of the bit map memory 15 and are stored as shown in FIG. 10E. Thereafter, the contents of the bit map memory 15 are printed on the printing paper by the printing mechanism.

Figures 11A, 11B:
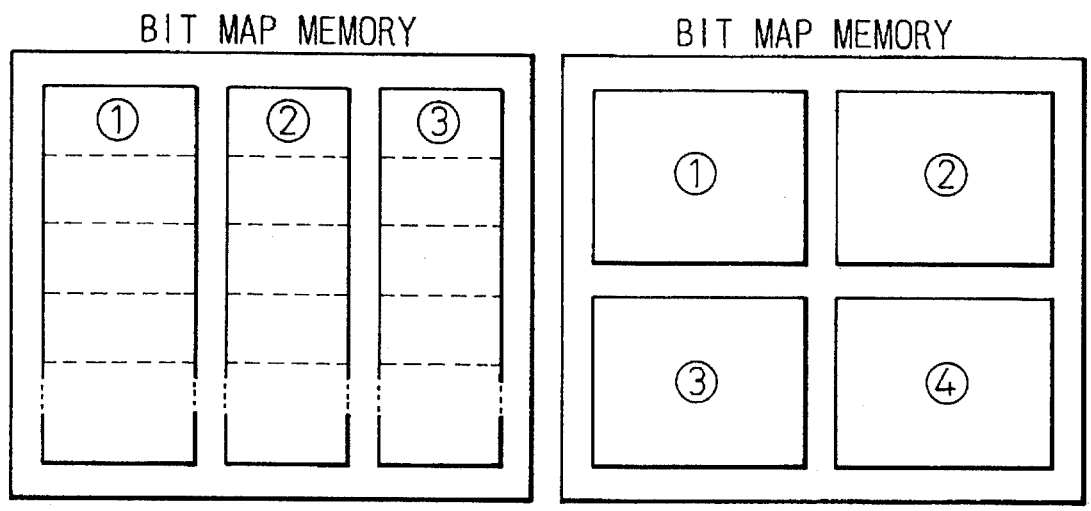
FIG. 11A is a diagram illustrating an example in which three documents are stored in the bit map memory.
FIG. 11B is a diagram illustrating an example in which four documents are stored in the bit map memory.

The above embodiment has illustrated the case where the bit map memory 15 was divided into two. The bit map memory 15, however, can be divided into three or more. FIG. 11A is a diagram illustrating a division of the bit map memory 15 where three documents are stored being divided in the bit map memory. The bit map memory 15 is divided in the vertical direction into a first region (1), a second region (2) and a third region (3).

Figure 11C:
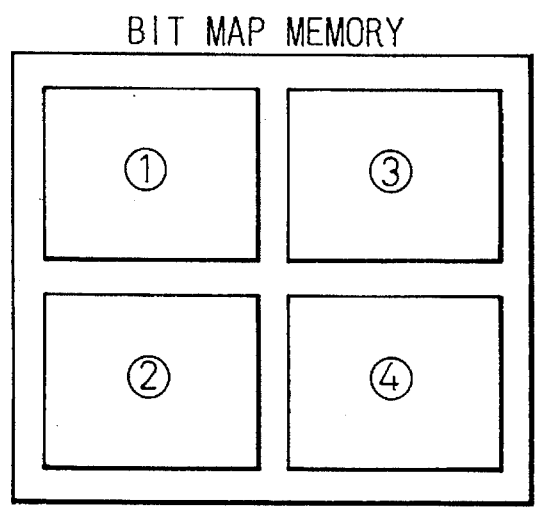
FIG. 11C is a diagram illustrating another example in which four documents are stored being divided in the bit map memory.

FIGS. 11B and 11C are diagrams illustrating divisions of the bit map memory 15 where four documents are stored being divided in the bit map memory. In the example of FIG. 11B, the first document is expanded on the left upper portion of the bit map memory 15, the second document is expanded on the right upper portion of the bit map memory 15, the third document is expanded on the left lower portion of the bit map memory 15, and the fourth document is expanded on the right lower portion of the bit map memory 15. In the example of FIG. 11C, furthermore, the first document is expanded on the left upper portion of the bit map memory 15, the second document is expanded on the left lower portion of the bit map memory 15, the third document is expanded on the right upper portion of the bit map memory 15, and the fourth document is expanded on the right lower portion of the bit map memory 15. According to the method of the present invention as described above, a plurality of documents can be expanded at any positions on the bit map memory 15.

Figure 12:
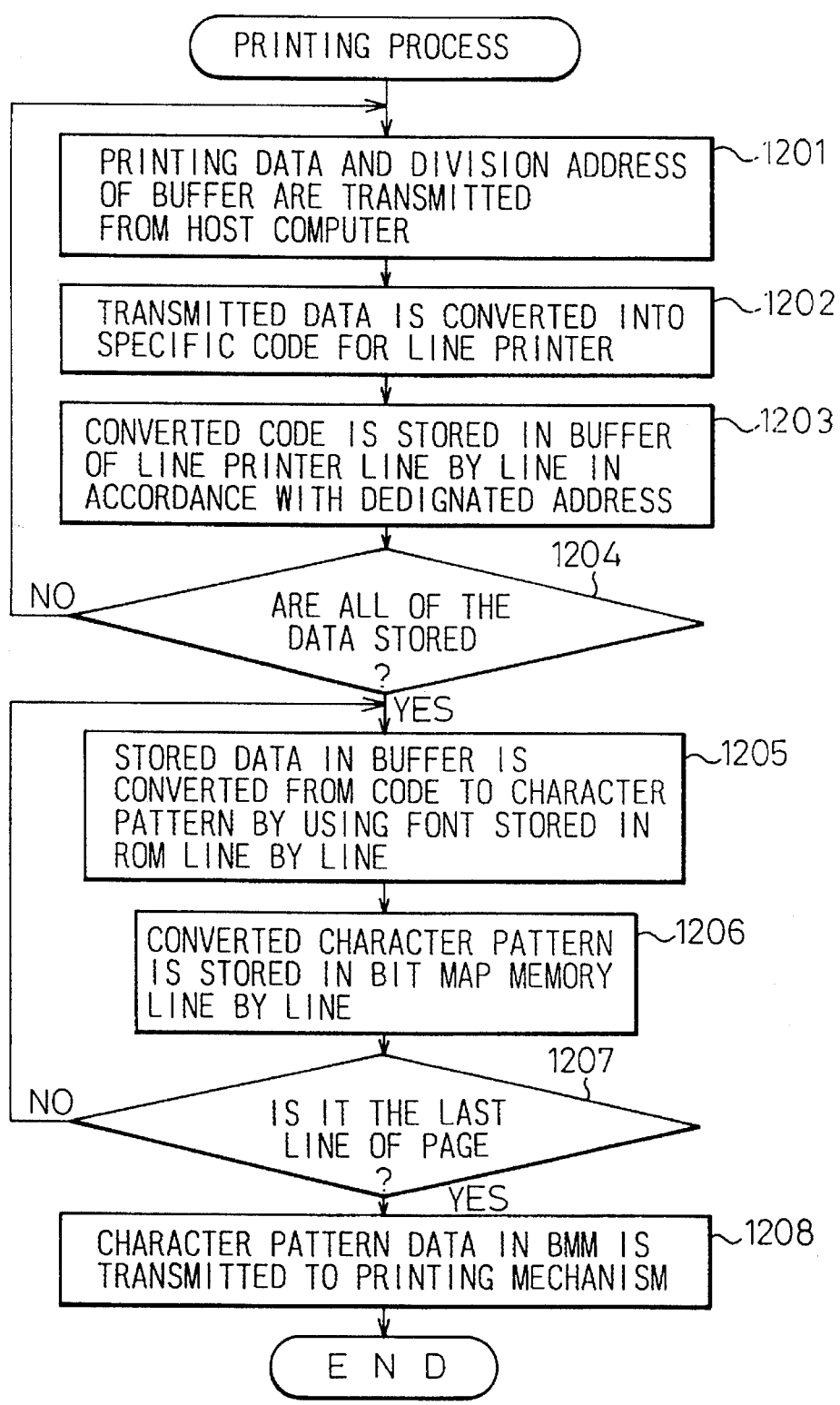
FIG. 12 is a flow chart illustrating the method of controlling the document printing in the line printer according to another embodiment of the present invention.
Figure 13:
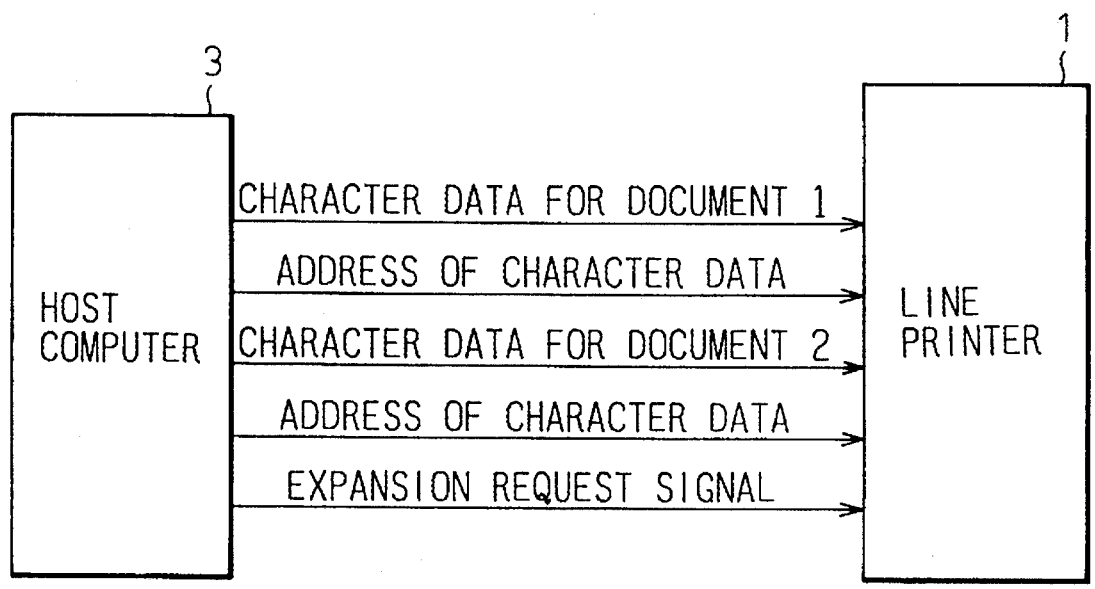
FIG. 13 is a diagram illustrating printing data input to the line printer in the method of controlling the document printing in the line printer of the present invention shown in FIG. 12.

Described below is the method of controlling the document printing in the line printer according to another embodiment of the present invention. FIG. 12 is a flow chart for explaining the method of controlling the document printing in the line printer according to another embodiment of the present invention, and FIG. 13 is a diagram illustrating printing data input to the line printer in the method of controlling the document printing in the line printer of the present invention of FIG. 12.

In the aforementioned embodiment, the data of a plurality of documents are stored by dividing the bit map memory 15. In this embodiment, on the other hand, the character data of a plurality of documents of which the codes are converted by the character data processing portion 12A are stored by dividing the buffer 14. As shown in FIG. 13, therefore, character data of the first document and an address assigned for using the buffer 14 in a divided manner are input to the line printer 1 from the host computer 3, and are transmitted, first, to the character data processing portion 12A. Then, the character data of the second document and an address of the buffer 14 for storing them are input to the character data processing portion 12A in the line printer 1. Finally, an expansion request signal to the character data expansion portion is input from the host computer 3 to the character data processing portion 12A in the line printer 1.

The print processing of the line printer 1 of when the data of a plurality of documents are input to the line printer 1 will now be described with reference to FIG. 12.

At step 1201, first, when the character data to be printed and an address of character data which is an address for dividing the buffer are transmitted from the host computer 3 to the character data processing portion 12A via the input interface 11, the character data processing portion 12A sequentially converts the transmitted data into particular codes for the line printer as represented by step 1202 and, then, stores the converted data in the buffer 14 of the line printer line by line as represented by step 1203. The storage position is determined by a designated address of character data input from the host computer 3.

At step 1204, it is judged whether the data of a plurality of documents are all stored in the buffer 14 or not. When the data are not all stored, the operations of from step 1201 to step 1203 are repeated, and the data of the next document are transmitted.

On the other hand, when the documents are all stored in the buffer 14, the character pattern expansion portion 12B is activated. At step 1205, the character pattern expansion portion 12B takes out the character data (codes) in the buffer 14 line by line, and forms character patterns from the character codes based upon fonts stored in the ROM 13. At step 1206, the thus converted character patterns are expanded and are stored in the bit map memory 15 line by line. That is, the data of all documents in the buffer 14 are expanded at one time into the bit map memory 15.

At step 1208, it is judged whether the expansion of character data of one page on the bit map memory 15 is finished or not based upon whether the stored line is the last line or not. When it is not the last line, the processing from step 1205 to step 1206 are repeated. On the other hand, when the stored line is the last line, and when the expansion of character data of one page on the bit map memory 15 is finished, the program proceeds to step 1208.

At step 1208, the character pattern data of a plurality of documents expanded on the bit map memory 15 are sent to the printing mechanism via the output interface 16 in order to execute the printing of one page.

Figure 14A:
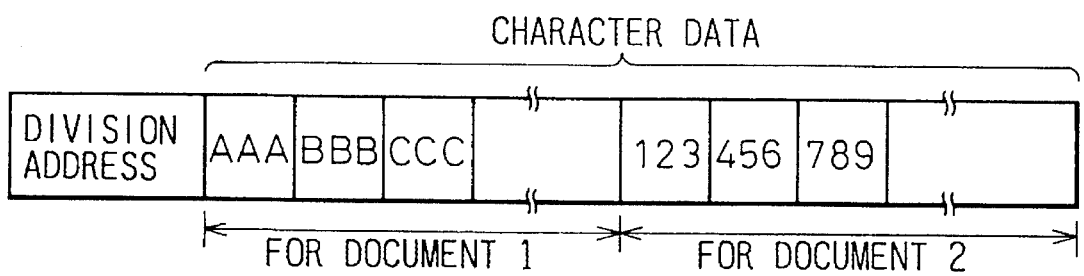
FIG. 14A is a diagram illustrating printing data input to the line printer in the method of controlling the document printing in the line printer of the present invention shown in FIG. 12.

FIG. 14A is a diagram of print data input to the line printer 1 in the method of controlling document printing in the line printer 1 of the present invention shown in FIG. 12. In this case, address data for dividing the buffer 14 is input, by the host computer 3, to the line printer 1 before the character data. Here, however, the address data for the buffer 14 may be input simultaneously with the character data of the document.

Figure 14B:
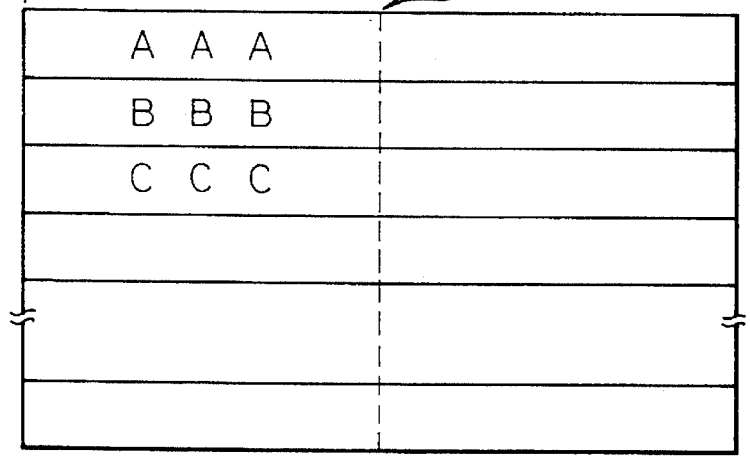
FIG. 14B is a diagram illustrating a state of the buffer storing the printing data of the first document of the present invention.

FIG. 14B illustrates a state where the character data of the first document and the address are input to the character data processing portion 12A, converted and are stored in the buffer 14. The results obtained by processing the character data of the first document are sequentially stored at positions designated by addresses that divide the buffer 14.

Figure 14C:
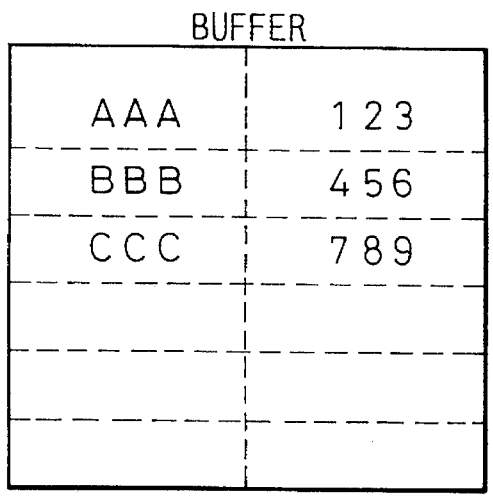
FIG. 14C is a diagram illustrating a state of the buffer storing the printing data of the first and second documents of the present invention.

Thereafter, as the character data of the second document shown in FIG. 14A are input to the character data processing portion 12A together with the address, the processed data are stored in the remaining positions in the buffer 14 as shown in FIG. 14C.

Figure 14D:
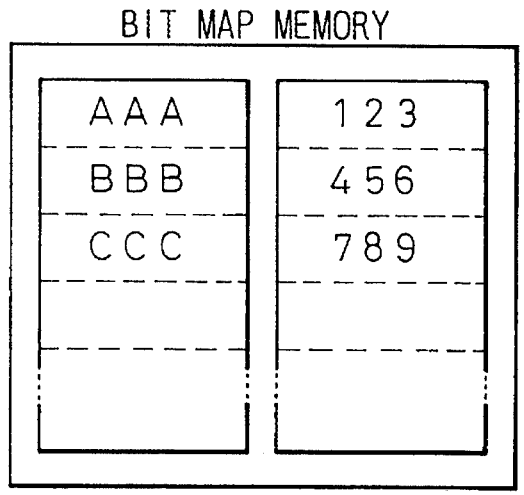
FIG. 14D is a diagram illustrating the bit map memory storing the printing data of the first and second documents of the present invention.

When the character data of all the documents are stored in the buffer 14, the character data expansion portion 12B is activated, whereby the character data of a plurality of documents in the buffer 14 are converted into character patterns line by line and are expanded into the bit map memory 15. FIG. 14D is a diagram illustrating the bit map memory 15 in which are stored the printing data of the first and second documents according to the present invention.

In the case of this embodiment, addresses for the buffer of when a plurality of documents are to be stored in the buffer 14 are directly designated from the host computer 3, and there is no need to provide an expansion position analyzing portion for dividing the bit map memory 15.

According to the present invention as described above, it is allowed to print a plurality of documents on one page without changing the data of the documents. According to the present invention which divides the bit map memory, expansion on the bit map memory can be carried out for each of the documents offering freedom of data design with the document as a unit. Moreover, in the case of the invention which stores character data of a plurality of documents by dividing the buffer, there is no need to analyze the expansion positions, and the controller can be simply constituted.

What is claimed is:

1. A method of controlling printing in a line printer, which processes printing data transmitted from a host computer and prints a document on a paper, comprising a character data processing portion that converts printing data input from the host computer into character codes of the line printer, a buffer for storing code data that are processed, a font memory for storing fonts of character patterns for the codes, a bit map memory for storing character pattern data to be printed, a character pattern expansion portion that forms character patterns by calling, from said font memory, fonts for said code data upon a request from said character data processing portion and stores the formed character patterns in said bit map memory, and a printing mechanism for printing the content of said bit map memory, wherein the method of controlling the printing in the line printer, comprising the steps of:

transmitting the print data to said line printer after inserting therein expansion position data which instruct the division of said bit map memory into a plurality of regions for the documents;

sending said expansion position data in said printing data to said character pattern expansion portion and storing other print data in said buffer after converting into codes by said character data processing portion;

analyzing the expansion position data by said character pattern expansion portion;

dividing said bit map memory into a plurality of regions in accordance with the result of analysis of said expansion position data by said character pattern expansion portion;

informing said character pattern expansion portion of every completion of storage of the character data of each document in the buffer by said character data processing portion;

calling fonts from said font memory in accordance with said code data read out from said buffer by said character pattern expansion portion upon a request from said character data processing portion; and storing called fonts as character patterns sequentially in a plurality of regions in said bit map memory that were previously divided by said character pattern expansion portion.

2. A method as set forth in claim 1, wherein the expansion position data are inserted in the print data by the operation of a monitor/control panel provided on the line printer.

3. A method as set forth in claim 1, wherein, said print data transmitting step includes a step of transmitting the character data of a plurality of documents sequentially after the expansion position data are transmitted to said line printer.

4. A method as set forth in claim 3, wherein the expansion position data are inserted in the print data by the operation of a monitor/control panel provided on the line printer.

5. A method as set forth in claim 1, further comprising the steps of:

inserting an instruction for partial printing into part of said printing data; and printing the document at the moment when the data of the document is stored in at least one of a plurality of regions of said bit map memory by said printing mechanism, when the instruction for partial printing has been inserted in said printing data.

6. A method of controlling the printing in a line printer which processes print data transmitted from a host computer and which prints a document on a paper, comprising a character data processing portion that converts print data input from the host computer into character codes of the line printer, a buffer for storing code data that has been processed, a font memory for storing fonts of character patterns for the codes, a bit map memory for storing character pattern data to be printed, a character pattern expansion portion that forms character patterns by calling, from said font memory, fonts for said code data upon a request from said character data processing portion and stores the formed character patterns in said bit map memory, and a printing mechanism for printing the content of said bit map memory, wherein the method of controlling the printing in the line printer, comprising the steps of:

transmitting the print data to said line printer after inserting therein an address of character data which instruct the division of said buffer into a plurality of regions for the documents;

analyzing said address by said character data processing portion;

dividing said buffer into a plurality of regions in accordance with the result of an analysis of said address by said character data processing portion;

converting the print data into code and storing said codes sequentially in a plurality of regions divided in the buffer by said character data processing portion;

informing said character pattern expansion portion of every completion of storage of the character data for one page of the paper in the buffer by said character data processing portion;

calling fonts from said font memory in accordance with said code data read out from said buffer by said character pattern expansion portion upon a request from said character data processing portion; and storing called fonts as character patterns sequentially in a plurality of regions in said bit map memory by said character pattern expansion portion.

7. A method as set forth in claim 6, wherein the expansion position data are inserted in the print data by the operation of a monitor/control panel provided on the line printer.

8. A method as set forth in claim 6, wherein said print data transmitting step includes a step of transmitting the character data of a plurality of documents sequentially after the expansion position data are transmitted to said line printer.

9. A method as set forth in claim 8, wherein the expansion position data are inserted in the print data by the operation of a monitor/control panel provided on the line printer.

10. An apparatus for controlling printing in a line printer, which processes printing data transmitted from a host computer and prints a document on a paper, comprising a character data processing portion that converts printing data input from the host computer into character codes of the line printer, a buffer for storing code data that are processed, a font memory for storing fonts of character patterns for the codes, a bit map memory for storing character pattern data to be printed, a character pattern expansion portion that forms character patterns by calling, from said font memory, fonts for said code data upon a request from said character data processing portion and stores the formed character patterns in said bit map memory, and a printing mechanism for printing the content of said bit map memory, wherein the method of controlling the printing in the line printer, comprising:

means for transmitting the print data to said line printer after inserting therein expansion position data which instruct the division of said bit map memory into a plurality of regions for the documents;

means for sending said expansion position data in said printing data to said character pattern expansion portion and storing other print data in said buffer after converting into codes by said character data processing portion;

means for analyzing the expansion position data by said character pattern expansion portion;

means for dividing said bit map memory into a plurality of regions in accordance with the result of analysis of said expansion position data by said character pattern expansion portion;

means for informing said character pattern expansion portion of every completion of storage of the character data of each document in the buffer by said character data processing portion;

means for calling fonts from said font memory in accordance with said code data read out from said buffer by said character pattern expansion portion upon a request from said character data processing portion; and means for storing called fonts as character patterns sequentially in a plurality of regions in said bit map memory that were previously divided by said character pattern expansion portion.

11. An apparatus as set forth in claim 10, wherein the expansion position data are inserted in the print data by the operation of a monitor/control panel provided on the line printer.

12. An apparatus as set forth in claim 10, wherein, said print data transmitting step includes a step of transmitting the character data of a plurality of documents sequentially after the expansion position data are transmitted to said line printer.

13. An apparatus as set forth in claim 12, wherein the expansion position data are inserted in the print data by the operation of a monitor/control panel provided on the line printer.

14. An apparatus as set forth in claim 10, further comprising:

means for inserting an instruction for partial printing into part of said printing data; and means for printing the document at a moment when the data of the document is stored in at least one of a plurality of regions of said bit map memory by said printing mechanism, when the instruction for partial printing has been inserted in said printing data.

15. An apparatus for controlling the printing in a line printer which processes print data transmitted from a host computer and which prints a document on a paper, comprising a character data processing portion that converts print data input from the host computer into character codes of the line printer, a buffer for storing code data that has been processed, a font memory for storing fonts of character patterns for the codes, a bit map memory for storing character pattern data to be printed, a character pattern expansion portion that forms character patterns by calling, from said font memory, fonts for said code data upon a request from said character data processing portion and stores the formed character patterns in said bit map memory, and a printing mechanism for printing the content of said bit map memory, wherein the method of controlling the printing in the line printer, comprising:

means for transmitting the print data to said line printer after inserting therein an address of character data which instruct the division of said buffer into a plurality of regions for the documents;

means for analyzing said address by said character data processing portion;

means for dividing said buffer into a plurality of regions in accordance with the result of an analysis of said address by said character data processing portion;

means for converting the print data into code and storing said codes sequentially in a plurality of regions divided in the buffer by said character data processing portion;

means for informing said character pattern expansion portion of every completion of storage of the character data for one page of the paper in the buffer by said character data processing portion; and means for calling fonts from said font memory in accordance with said code data read out from said buffer by said character pattern expansion portion upon a request from said character data processing portion; and means for storing called fonts as character patterns sequentially in a plurality of regions in said bit map memory by said character pattern expansion portion.

16. An apparatus as set forth in claim 15, wherein the expansion position data are inserted in the print data by the operation of a monitor/control panel provided on the line printer.

17. An apparatus as set forth in claim 15, wherein, said print data transmitting step includes a step of transmitting the character data of a plurality of documents sequentially after the expansion position data are transmitted to said line printer.

18. An apparatus as set forth in claim 17, wherein the expansion position data are inserted in the print data by the operation of a monitor/control panel provided on the line printer.

19. A method as set forth in claim 2, further comprising the steps of:

inserting an instruction for partial printing into part of said printing data; and printing the document at the moment when the data of the document is stored in at least one of a plurality of regions of said bit map memory by said printing mechanism, when the instruction for partial printing has been inserted in said printing data.

20. A method as set forth in claim 3, further comprising the steps of:

inserting an instruction for partial printing into part of said printing data; and printing the document at the moment when the data of the document is stored in at least one of a plurality of regions of said bit map memory by said printing mechanism, when the instruction for partial printing has been inserted in said printing data.

21. A method as set forth in claim 4, further comprising the steps of:

inserting an instruction for partial printing into part of said printing data; and printing the document at the moment when the data of the document is stored in at least one of a plurality of regions of said bit map memory by said printing mechanism, when the instruction for partial printing has been inserted in said printing data.

22. An apparatus as set forth in claim 11, further comprising:

means for inserting an instruction for partial printing into part of said printing data; and means for printing the document at a moment when the data of the document is stored in at least one of a plurality of regions of said bit map memory by said printing mechanism, when the instruction for partial printing has been inserted in said printing data.

23. An apparatus as set forth in claim 12, further comprising:

means for inserting an instruction for partial printing into part of said printing data; and means for printing the document at a moment when the data of the document is stored in at least one of a plurality of regions of said bit map memory by said printing mechanism, when the instruction for partial printing has been inserted in said printing data.

24. An apparatus as set forth in claim 13, further comprising:

means for inserting an instruction for partial printing into part of said printing data; and means for printing the document at a moment when the data of the document is stored in at least one of a plurality of regions of said bit map memory by said printing mechanism, when the instruction for partial printing has been inserted in said printing data.

* * * * *